(12) United States Patent
Hardwick et al.

(10) Patent No.: US 8,317,959 B2
(45) Date of Patent: *Nov. 27, 2012

(54) METHOD OF MAKING MULTI-PLY DOOR CORE, MULTI-PLY DOOR CORE, AND DOOR MANUFACTURED THEREWITH

(75) Inventors: Geoffrey B. Hardwick, St. Charles, IL (US); Randy C. McGuire, Danville, VA (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,447

(22) Filed: Jan. 3, 2012

(65) Prior Publication Data

US 2012/0097320 A1   Apr. 26, 2012

Related U.S. Application Data

(60) Continuation of application No. 13/004,219, filed on Jan. 11, 2011, now Pat. No. 8,087,212, which is a division of application No. 11/962,585, filed on Dec. 21, 2007, now Pat. No. 7,866,119, which is a division of application No. 10/624,504, filed on Jul. 23, 2003, now Pat. No. 7,314,534.

(51) Int. Cl.
*B29C 47/00* (2006.01)

(52) U.S. Cl. ........ 156/245; 156/196; 156/219; 264/109; 264/119

(58) Field of Classification Search ................. 52/309.1, 52/309.14, 309.15, 784.1, 313, 314, 455, 52/784.14, 784.15, 793.1; 428/15, 58; 156/245, 156/196, 219, 306.3; 264/119, 109, 124

See application file for complete search history.

(56) References Cited

U.S. PATENT DOCUMENTS

| | | | | |
|---|---|---|---|---|
| 2,675,338 A * | 4/1954 | Phillips | ......................... | 156/224 |
| 3,715,257 A * | 2/1973 | Dunaway et al. | ............. | 156/299 |
| 4,084,996 A * | 4/1978 | Wheeler | ....................... | 156/257 |
| 4,290,248 A * | 9/1981 | Kemerer et al. | ........... | 52/309.16 |
| 6,312,540 B1 * | 11/2001 | Moyes | ............................ | 156/87 |
| 6,364,982 B1 * | 4/2002 | Lynch et al. | ................... | 156/196 |
| 6,764,625 B2 * | 7/2004 | Walsh et al. | ................... | 264/119 |
| 6,866,740 B2 * | 3/2005 | Vaders | ........................... | 156/267 |
| 7,284,352 B2 * | 10/2007 | Lynch et al. | ..................... | 52/455 |
| 7,314,534 B2 * | 1/2008 | Hardwick et al. | ............. | 156/245 |
| 7,695,658 B2 * | 4/2010 | Hardwick et al. | ............. | 264/119 |
| 7,866,119 B2 * | 1/2011 | Hardwick et al. | ......... | 52/784.14 |
| 7,964,051 B2 * | 6/2011 | Lynch et al. | .................. | 156/219 |
| 8,087,212 B2 * | 1/2012 | Hardwick et al. | ......... | 52/784.14 |
| 8,096,095 B2 * | 1/2012 | Lynch et al. | ............... | 52/745.19 |
| 2004/0231265 A1 * | 11/2004 | Walsh | ............................ | 52/455 |

\* cited by examiner

*Primary Examiner* — William V Gilbert
*Assistant Examiner* — Chi Q Nguyen
(74) *Attorney, Agent, or Firm* — Berenato & White, LLC (57) ABSTRACT

The present invention concerns a method of forming a multiply core component. A mold press is provided having an upper die and a lower die defining a mold cavity. At least one of the upper die and the lower die has a plurality of protrusions. A first wood composite board and a second wood composite board are disposed within the mold cavity. The first and second boards are fused proximate the plurality of protrusions by compressing the boards in the mold cavity through application of heat and pressure.

22 Claims, 6 Drawing Sheets

МЕТHOD OF MAKING MULTI-PLY DOOR CORE, MULTI-PLY DOOR CORE, AND DOOR MANUFACTURED THEREWITH

CROSS-REFERENCE TO RELATED APPLICATIONS AND CLAIM TO PRIORITY

This application is a continuation of application Ser. No. 13/004,219, filed Jan. 11, 2011, now U.S. Pat. No. 8,087,212, which is a division of application Ser. No. 11/962,585, filed Dec. 21, 2007, now U.S. Pat. No. 7,866,119, which is a division of application Ser. No. 10/624,504, filed on Jul. 23, 2003, now U.S. Pat. No. 7,314,534, the disclosures of which are incorporated herein by reference and to which priority is claimed.

FIELD OF THE INVENTION

The present invention is directed to a method of forming a multi-ply core component. The disclosed method comprises the steps of: providing a mold press having an upper die and a lower die defining a mold cavity, at least one of the upper die and the lower die having a plurality of protrusions; disposing a first wood composite board and a second wood composite board within the mold cavity; and fusing the first and second boards proximate the plurality of protrusions by compressing the first and second boards in the mold cavity through application of heat and pressure. The present invention is also directed to the resulting multi-ply core component formed by practice of the method, and a door comprising the core component.

BACKGROUND OF THE INVENTION

Man-made boards, such as fiberboard, can be embossed or molded to have three-dimensional shapes and various design and structural features found in natural wood. Types of useful man-made boards including: (a) fiberboards such as hardboard (e.g., low-density hardboard), soft board, and medium-density fiberboard and (b) chipboards such as particleboard, medium-density particleboard, and oriented strandboard ("OSB"). Composites of these boards are also useful. Such boards, particularly hardboard, have found widespread use in the manufacture of doorskins.

Commonly, doorskins (also referred to as door facings) are molded from a planar cellulosic mat to include one or more interior depressions or contours, such as one or more square or rectangular depressions that do not extend to the outer edge or periphery of the doorskin product. Doorskins often require inclined molded walls having a plurality of contours that include varied curved and planar surfaces. Where the depressions or contours are included on a doorskin product, this can serve to replicate a more expensive natural wood paneled door. For example, door skins having two, three, four, five, and six panel designs are commonly produced. The exterior or visible surfaces of the fiberboard also can be embossed with a design simulating a wood grain pattern such as found in a natural piece of wood.

A hollow core door typically includes a peripheral frame, and two door skins having exterior surfaces and interior surfaces secured to opposite sides of the frame using an adhesive binder. The binder is placed at least at the contact points along the periphery of the door assembly. Because the door skins are contoured, and because of the width of the frame, an open interior or hollow space of varying dimensions is formed between the spaced door skins.

A door having such an open interior may not have the characteristics of a natural solid wood door, because the interior spaces defined by the door skins will be hollow or empty. The hollow spaces cause the door to be lighter than may be preferred. Further, the sound insulation provided by such doors may not be satisfactory in particular installations. A core material (e.g., core pieces or components) is sometimes used to fill these hollow spaces. Such a door may be known as a hollow core door.

Conventional core materials for use in hollow core doors include corrugated cardboard and paper. However, such materials may not provide adequate sound insulation. In addition, they may not provide the door with the desired weight, for example the weight of a similarly-styled natural solid wood door.

Other conventional core materials include wood composite materials, such as composite softboard. Such door cores are suitable for some applications, such as doors requiring relatively thin door cores having a thickness of 0.375 inches or less. However, standard exterior residential door cores are 1.125 inches thick (for a 1.375 inch thick door). Standard exterior commercial door cores are typically 1.50 inches thick (for a 1.750 inch thick door). The manufacture of conventional door cores using prior techniques have not been cost effective for door cores having a thickness or caliper of 1.00 inch or greater.

Generally, conventional techniques for providing a thicker door core suitable for exterior residential and commercial door use involve either laminating two or more thinner boards using a synthetic resin or molding a single core. Neither of these techniques provides an inexpensive, cost effective core product for all core requirements.

Techniques involving laminating two or three relatively thin, wood composite boards using a synthetic adhesive, such as casein or polyvinyl acetate, are expensive and inefficient. The adhesive increases manufacturing costs. In some cases, manufacturing costs for producing a core component having a caliper of 1.00 inch or more have been cost prohibitive when adhesives are used. Therefore, such methods are not desirable for door core manufacturers, or result in an expensive door for consumers.

Techniques involving molding a mat of material to the desired configuration and caliper of 1.00 inch or greater also fail to provide a cost effective alternative. Many doors include a door core component having a density of between about 10 lb/ft$^3$ to about 30 lb/ft$^3$. When forming a one-piece core component in that density range, having a thickness of more than 1.00 inch, it is difficult to successfully dry the core material thoroughly without burning the surfaces. In addition, manufacturing costs are increased due to the amount of press time and press temperature required, as well as the amount of material needed to form the core.

Therefore, there is a need for a door core component having a thickness of 1.00 inch or greater that is cost effective to manufacture, and that has insulation and weight characteristics desirable to consumers.

SUMMARY OF THE INVENTION

The present invention relates to a method of forming a multi-ply core component. A mold press is provided having an upper die and a lower die defining a mold cavity. At least one of the upper die and the lower die has a plurality of protrusions. A first wood composite board and a second wood composite board are disposed within the mold cavity. The first and second boards are fused proximate the plurality of protrusions by compressing the first and second boards in the mold cavity through application of heat and pressure.

The present invention also concerns a multi-ply wood composite core component. The core component has at least first and second fused plies. The fused plies have first portions at a first density and second portions at a second density greater than the first density. The plies are fused together at the second portions.

A door comprises a peripheral frame having opposing sides, first and second door skins, and a wood composite core component. Each of the skins has an exterior surface and an interior surface secured to one of the sides of the frame. The core component is disposed between the interior surfaces of the skins. The core component has at least first and second fused plies, and has first portions at a first density and second portions at a second density. The second density is greater than the first density. The plies are fused together at the second portions.

DETAILED DESCRIPTION OF THE INVENTION

Figure 1:
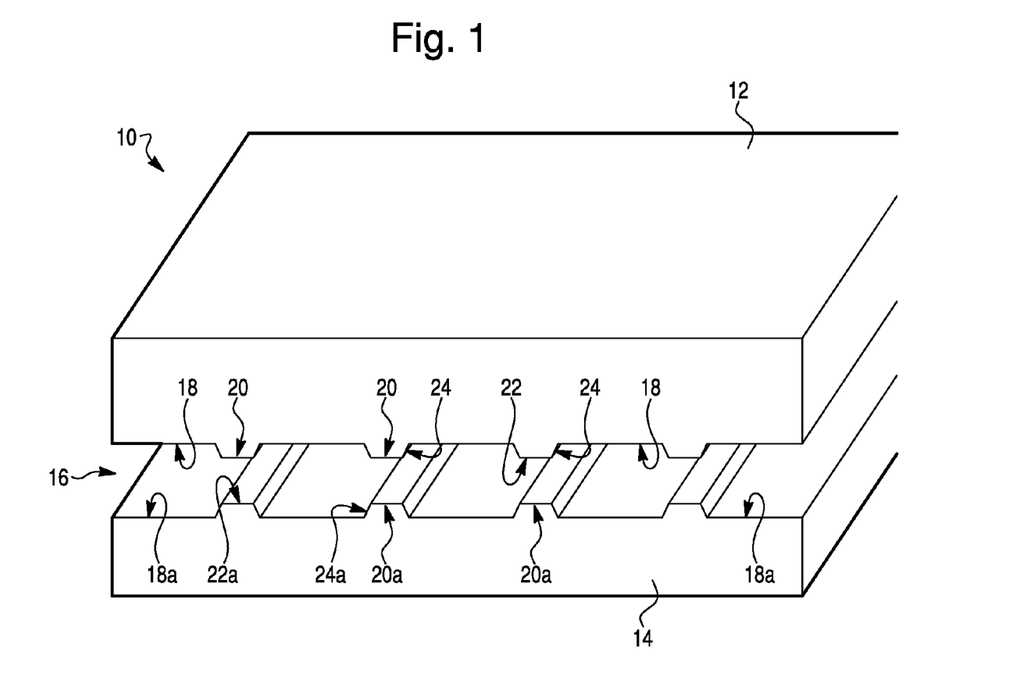
FIG. 1 is a fragmentary perspective view of a mold press according to the present invention.

As best shown in FIG. 1, mold press 10 comprises an upper mold die 12 and a lower mold die 14 defining therebetween a mold cavity 16. Upper die 12 includes planar portions 18 and a plurality of protrusions 20. Protrusions 20 preferably include outer planar portions 22 and sidewalls 24 extending from and integral with outer planar portions 22 and planar portions 18. Sidewalls 24 extend angularly from planar portions 18 to outer planar portions 22 in the range of about 20° to about 80°, preferably from about 30° to about 50°. Similarly, lower die 14 preferably includes planar portions 18a and a plurality of protrusions 20a. Protrusions 20a also include outer planar portions 22a and sidewalls 24a. Protrusions 20a on lower die 14 are aligned with protrusions 20 on upper die. Specifically, planar portions 18 and 18a, and outer planar portions 22 and 22a, are preferably aligned and parallel to each other, respectively. Protrusions 20 and 20a are disposed adjacent each other in order to apply the required forces to achieve the results of the invention.

Figure 2:
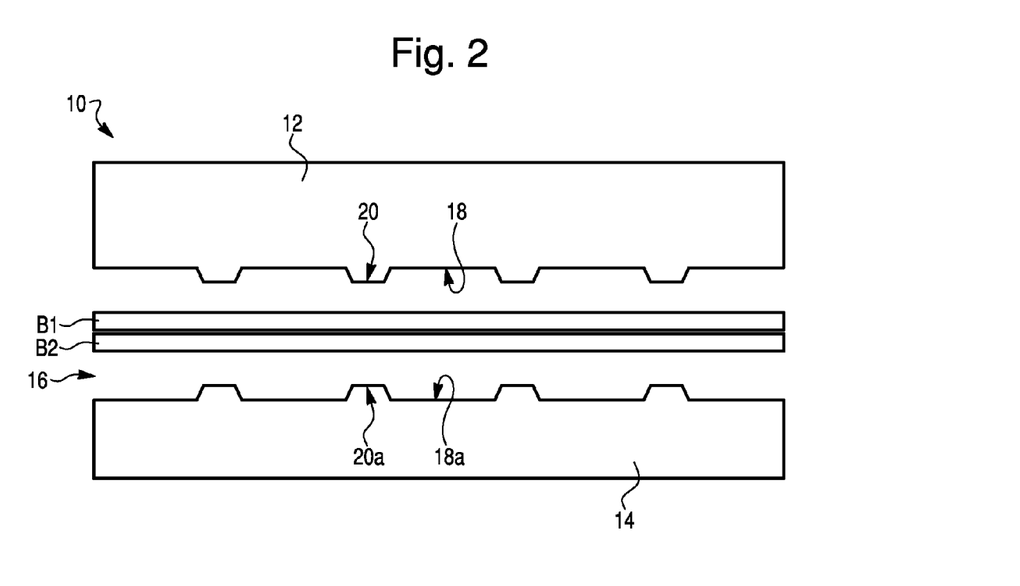
FIG. 2 is an elevational view of the mold press of FIG. 1.

As best shown in FIG. 2, at least a first board 131 and a second board B2 are disposed between upper and lower dies 12, 14. Preferably, boards B1, B2 each have an initial thickness of at least about 0.50 inches to about 1.00 inch, more preferably between about 0.70 inches to about 0.80 inches, an initial density of between about 10 lb/ft$^3$ to about 25 lb/ft$^3$, more preferably about 15 lb/ft$^3$, and an initial moisture content of about 6.5% by weight. Boards B1, B2 are preferably low density boards, such as softboard or insulation board. Preferably, boards B1, B2 do not contain any synthetic resin. Rather, the wood fibers in boards B1, B2 are held together by the natural wood binder lignin, as known in the art. However, it should be understood that wood composite boards containing synthetic resin, or even tongue oil, may also be used in the present invention. However, such boards are generally more expensive than resin-free boards.

Boards B1, B2 are compressed in mold press 10 using heat and pressure, as known in the art. Preferably, mold cavity 16 has a temperature of about 400° F. to about 500° F., more preferably about 450° F. Pressure is increasingly applied to boards B1, B2 during compression, until a maximum desired pressure is achieved. Preferably, the press pressure is in the range of about 400 pounds per square inch (psi) to about 850 psi, more preferably in the range of about 600 psi to about 800 psi. After the maximum pressure is achieved, it is sustained for a selected period of time in order to fuse boards B1, B2 together. This hold time at which maximum pressure is sustained is preferably about five minutes. However, the hold time may be as short as about 150 seconds, depending on the temperature of mold cavity 16, the press pressure, and moisture content of the boards being fused.

Figure 3:
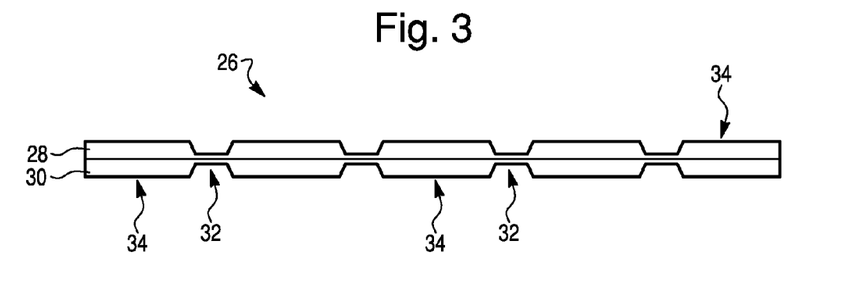
FIG. 3 is an elevational view of a core component according to the present invention.

Applicants have discovered that wood fibers from boards B1, B2 are sufficiently fused together during the compression operation without requiring the use of an additional adhesive. The natural lignin in the wood fibers of boards B1, B2 is fused together in portions compressed by protrusions 20, 20a. As best shown in FIG. 3, a multi-ply core component 26 is formed having an inverse configuration of mold cavity 16. Core component 26 comprises a first ply 28, a second ply 30, and fused portions 32. First and second plies 28, 30 form low density portions 34 having a thickness of between about 1.00 inch to about 2.00 inches, more preferably between about 1.125 inches to about 1.50 inches, and having a specific gravity of about 1.10 or less, preferably a specific gravity of about 1.00 or less. By contrast, fused portions 32 have a thickness of between about 0.25 inches to about 0.50 inches, and a relatively high density with a specific gravity of at least about 1.20, preferably at least about 1.30. Due to the angles of sidewalls 24, 24a, there is a density differential between fused portions 32 and low density portions 34.

The ability to adequately fuse boards B1, B2 together, and the resulting high density of fused portions 32, is achieved through the focused concentration of heat and pressure between converging protrusions 20, 20a during compression. On the other hand, relatively low heat and pressure is applied to low density portions 34 due to the configuration of mold cavity 16. Boards B1, B2 preferably undergo only minimal or no compressive forces in low density portions 34. In this way, the full thickness of boards B1, B2 is maintained in low density portions 34 of core component 26. The preferred thickness of low density portions 34 is preferably about 1.125 inches or 1.50 inches, depending on whether the core component is to be used in a residential or commercial door, respectively. If any compression does occur in low density portions 34, generally the thickness of portions 34 is unaffected, or the wood fibers "spring back" to their initial thickness after the compression process.

Figure 4:
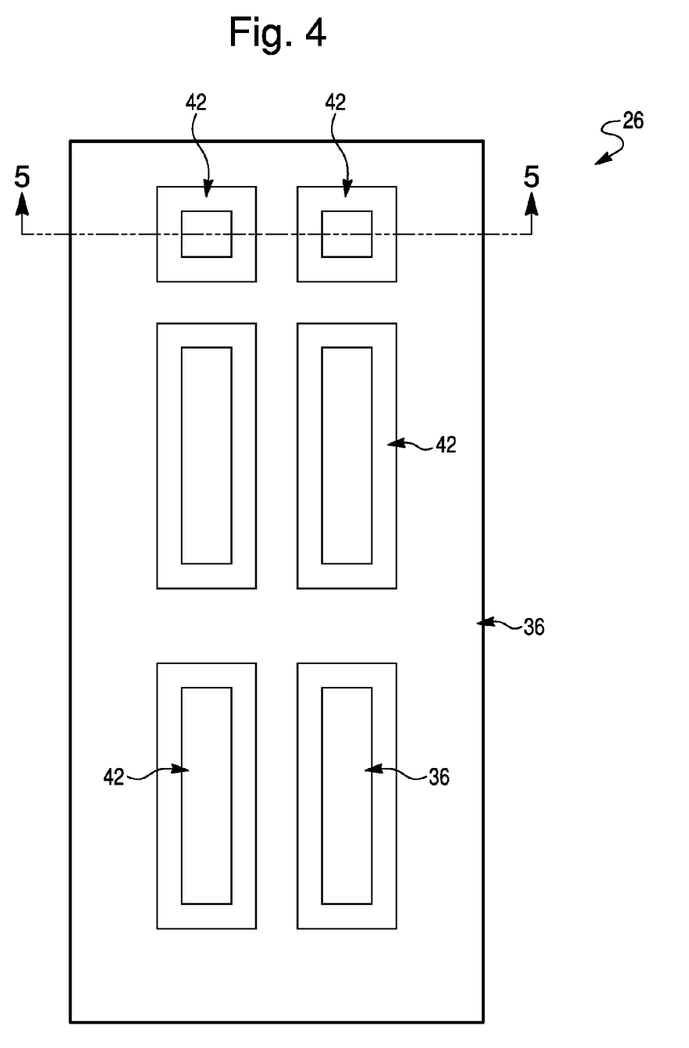
FIG. 4 is an elevational view of a core component.
Figure 5:
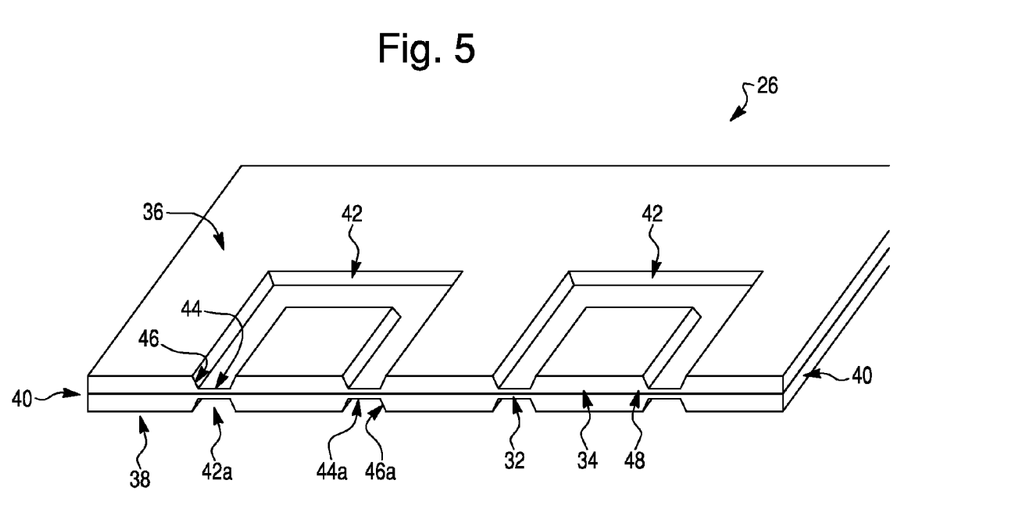
FIG. 5 is a fragmentary perspective view partially in section taken along line 5-5 of FIG. 4 and viewed in the direction of the arrows.

Plies 28, 30 are fused together and form a single core component 26 having a variable density. As best shown in FIGS. 4 and 5, core component 26 includes a first major surface 36, an opposing second major surface 38, and edges 40. Core component 26 also includes a first plurality of channels 42 extending inwardly into core component 26 relative to first major surface 36, and a second plurality of channels 42a extending inwardly into core component 26 relative to second major surface 38. Each of the first plurality of channels 42 includes a bottom 44 and sides 46 extending angularly from and integral with bottom 44 and first major surface 36. Likewise, each of second plurality of channels 42a includes a bottom 44a and sides 46a extending angularly from and integral with bottom 44a and second major surface 38.

Fused portions 32 are formed between channels 42, 42a. As well known in the art, the density of a wood composite substrate increases as the caliper or thickness decreases during a compressive operation if the substrate has an initial thickness and density that is substantially uniform. Therefore, core component 26 has the highest density between bottoms 44, 44a of channels 42, 42a. Because of the configuration of protrusions 20, 20a, core component 26 exhibits a gradually decreasing density in transition portions 48 formed between sides 46, 46a. Low density portions 34 have the lowest density of any portion of core component 26. Transition portions 48 have a density that gradually increases from a density substantially equal to low density portions 34 in areas adjacent low density portions 34, to a density substantially equal to the density of fused portions 32 in areas adjacent fused portions 32.

Density variations between low density portions 34, fused portions 32 and transition portions 48 are created by the configuration of mold cavity 16, and the compressive forces acting on boards B1, B2. During the compression operation, force is applied when protrusions 20, 20a are pressed into boards B1, B2. This applied force is perpendicular to the surfaces of boards B1, B2, thereby compressing boards B1, B2 to form channels 42, 42a of core component 26. In addition, as protrusions 20, 20a are pressed into boards B1, B2, the applied force also creates internal forces within and between the wood fibers, which generate forces away from the applied force created by protrusions 20, 20a. As boards B1, B2 are squeezed together during the compression operation, compressive forces disrupt the lignin in wood fibers between protrusions 20, 20a. The wood fibers and lignin are reconfigured and fused together to form fused portions 32.

The internal forces of the fibers in boards B1, B2 extend perpendicular to the applied force from protrusions 20, 20a. As the applied force from protrusions 20, 20a increases, the outwardly extending internal forces are also increased, creating a force that flares out from protrusions 20, 20a. However, protrusions 20, 20a are spaced to provide low density portions 34 between adjacent, high density compression areas (forming fused portions 32). This provides for the variable density of core component 26 (i.e. high density of fused portions 32, a low density of low density portions 34, and transitional density portions 48). Transition portions 48 and low density portions 34 provide an area for dissipation of the compressive and internal forces created in fused portions 32.

In this way, additional pressure may be applied to fused portions 32, thereby increasing the density of fused portions 32 even more. Specifically, steam is created in the wood fiber material during compression operations due to the applied heat and pressure. By allowing this steam to escape, pressure is decreased. The steam created during the compression operation migrates from areas of high pressure (i.e. fused portions 32) to areas of low pressure (i.e. low density portions 34). In this way, the compression of fused portions 32 may be maximized, since pressure may be increased or maintained in these areas, creating thinner, more highly compressed areas. Previously, the effects of compressive and internal forces limited the achievable density of wood composite boards. Conventional wood composite boards typically have a specific gravity of about 1.00 or less. Attempts to achieve boards having higher densities often resulted in blow-out or collapse of the substrate due to the effects of such forces. In the present invention, fused portions 32 of core component 26 may be compressed to a much higher density than previously achievable, having a specific gravity of 1.20 or even 1.30 or higher, thereby overcoming the prior limitations caused by compressive and internal forces. Such densities are possible due to the configuration of mold cavity 16, wherein high compressive and internal forces may be dissipated in low density portions 34.

Transition portions 48 have a gradually decreasing density due to the gradually dissipating internal and compressive forces, which migrate outwardly from the applied compressive forces of protrusions 20, 20a. Thus, internal forces due to compression create a compression zone (i.e. transition portions 48) that spreads out from a point of applied force (i.e. protrusions 20, 20a), a phenomenon not unlike that found in soil mechanics.

Most of the compressive force applied by protrusions 20, 20a of mold press 10 is concentrated in areas forming fused portions 32. Fused portions 32 comprise a relatively small surface area of core component 26, relative to first and second major surfaces 36, 38. For example, as best shown in FIG. 4, first major surface 36 of core component includes recessed channels 42, formed by protrusions 20 as described above. Second major surface 38 (shown in FIG. 5), includes a corresponding pattern of channels 42a that are aligned with channels 42. Only fused portions 32 defined by these channels 42, 42a are high density areas. It is apparent from FIG. 4 that a majority of the surface area of major surface 36 comprises low density portions 34. Thus, a majority of core component 26 has a relatively low specific gravity defined by low density portions 34. In this way, compressive forces may be concentrated in relatively small areas of core component 26 during formation, with ample low density portions 34 for dissipating internal forces created therefrom.

It should be noted that various configurations of protrusions 20, 20a may be used, so long as sufficient fused portions 32 are formed to adjoin boards B1, B2 together. The bond achieved need not be overly strong, because core component 26 is to be used as an internal door core or other internal core, such as a core for use with wainscot. Once positioned within the hollow space between the door skins, core component 26 is not likely to delaminate. Boards B1, B2 are sufficiently fused to permit handling during manufacture without delaminating.

Figure 6:
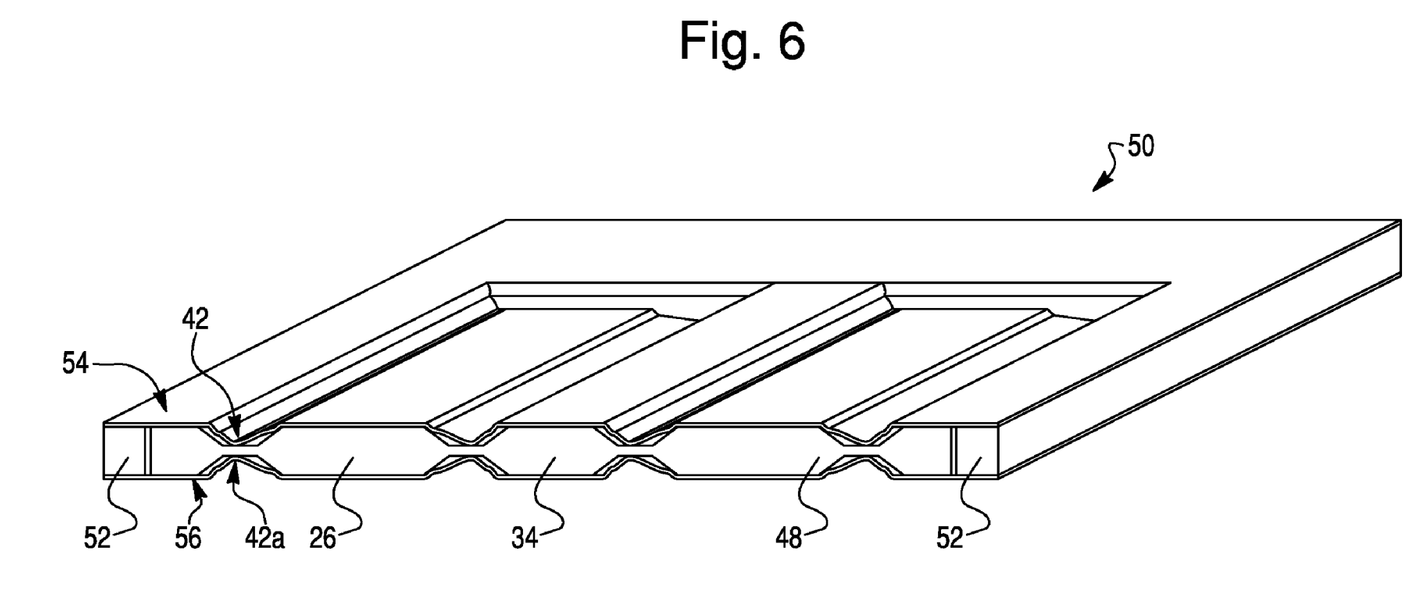
FIG. 6 is a perspective view partially in section of a door having a core component according to the present invention.

For example, a door 50 is best shown in FIG. 6 including core component 26. Door 50 includes a peripheral frame 52 formed of wood stiles and rails, and having opposing sides. First and second door skins 54, 56 are adhesively secured to frame 52. Each of skins 54, 56 has an interiorly disposed surface that is secured to opposing sides of frame 52, as well known in the art. Core component 26 is disposed between skins 54 and 56. Core component 26 may be secured to frame 52 or skins 54, 56 using an adhesive, though use of such an adhesive is not necessary. Core component 26 may be configured to have channels 42, 42a (as described above) that correspond to the configuration of molded skins 54, 56. Molded skins 54, 56 may be configured to simulate door facings having a plurality of panels, as known in the art.

Figure 7:
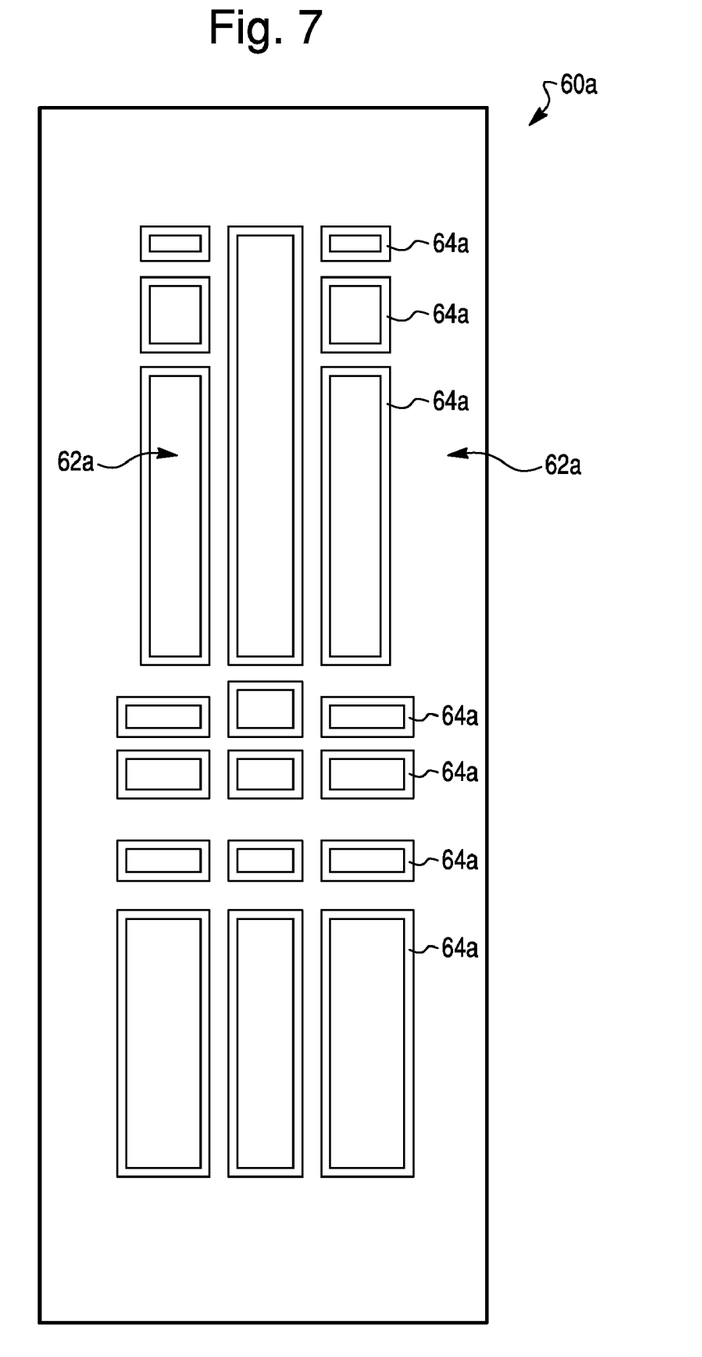
FIG. 7 is an elevational view of a universal core component according to the present invention.

It should be understood that core component 26 may be configured to correspond to various door configurations. For example, a universal core component 60A may be used that can accommodate different styles of molded door skins, as best shown in FIG. 7. Core component 60A includes a first major surface 62A and channels 64A recessed from first major surface 62A. The opposite side of core component 60A also includes channels (not shown) aligned with channels 64A. As described above, fused portions are formed between channels 64A and the channels on the opposing side of core component 60A. Core component 60A has the same configuration as described above for core component 26, except that channels 64A form a different pattern compared to channels 42 in core component 26. Thus, any configuration of channels may be formed into core component 60A (or 26), as long as a sufficient portion defines low density portions (i.e. first major surface 62A).

Figure 8:
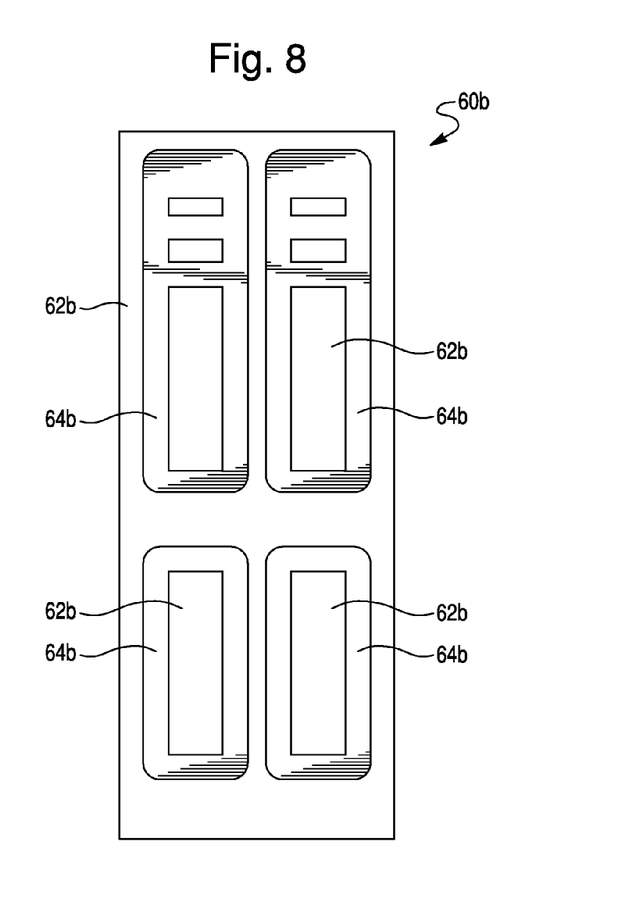
FIG. 8 is an elevational view of a universal core component according to a second configuration.

As best shown in FIG. 8, another configuration for a universal core component 60B is provided, which may also be used for various door configurations. Core component 60B includes a first major surface 62B and channels 64B, as described above. However, channels 64B have a different configuration compared to channels 64A (or channels 42). In addition, channels 64B are relatively wide compared to channels MA. As such, the fused portions in core component 60B are also relatively wide. Thus, channels 64B may have varying widths, so long as there are sufficient low density portions (i.e. first major surface 62B) to permit internal forces from dissipating during the compression process and formation of the fused portions.

Figure 9:
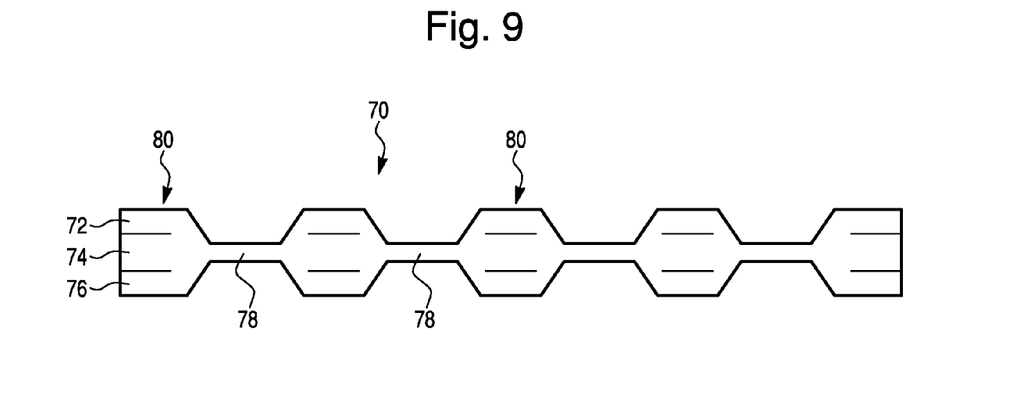
FIG. 9 is an elevational view of a core component according to a second embodiment.

In a second embodiment of the present invention, three or more boards are fused together. For example, as best shown in FIG. 9, core component 70 comprises a first ply 72, a second ply 74, a third ply 76 and fused portions 78. Core component 70 is formed by compressing three boards together using the same process described above. Flies 72, 74, 76 form low density portions 80 having a specific gravity of about 1.10 or less, preferably 1.00 or less. Fused portions 78 have a higher density, as described above for core component 10, having a specific gravity of at least about 1.20, preferably at least about 1.30.

Preferably, boards used to form core component 70 each have a thickness of between about 0.375 inches to about 0.667 inches. As such, the total combined thickness of low density portions 80 of core component 70 is between about 1.125 inches to about 1.50 inches. Fused portions 78 have a thickness of between about 0.25 inches to about 0.50 inches. A core component having four plies may even be achieved using the same process, wherein four thinner boards are fused together.

The present invention provides a method of manufacturing a core component that is cost effective and provides insulation and weight characteristics desired for a door. By eliminating the need for an adhesive, the core component disclosed herein is substantially cheaper to manufacture compared to conventional door cores. The disclosed method allows for the production of two or more thinner, easily dried plies that may then be laminated together without the use of an additional adhesive.

It will be apparent to one of ordinary skill in the art that various modifications and variations may be made in configuration or construction of the present invention without departing from the scope or spirit of the invention. For example, initial density, thickness and moisture content of the boards being fused, as well as press temperature, press time and die pattern, are interrelated variables that may differ depending on the particular boards being fused as well as the desired configuration and application of the resulting core component. It is intended that the present invention cover all such modifications and variations, provided they come within the scope of the following claims and their equivalents.

We claim as follows:

1. A method of forming a core component comprising:
placing a first wood composite board and a second wood composite board in a mold cavity defined by an upper die and a lower die;
compressing and fusing the first and second wood composite boards to form a core component comprising a first region and a second region, the second region having a higher density than the first region, wherein portions of the first wood composite board and the second wood composite board corresponding to the second region are fused to one another without the addition of adhesive.

2. The method of claim 1, wherein the second region has a specific gravity of at least 1.20.

3. The method of claim 1, wherein the second region has a specific gravity between 1.0 and about 1.30.

4. The method of claim 1, wherein the first region comprises an outer planar surface and the second region comprises a channel recessed from the outer planar surface.

5. The method of claim 4, wherein the channel comprises a bottom, a first side wall, and a second side wall.

6. The method of claim 5, wherein the first and second sidewalls extend obliquely between the planar surface and the bottom.

7. The method of claim 4, wherein at least one of the upper die and lower die comprise a protrusion for forming the channel.

8. The method of claim 1, wherein the first wood composite board and the second wood composite board comprise a member selected from the group consisting of fiberboard, oriented strand board, softboard, and insulation board.

9. A method of making a core component comprising:
compressing a first wood composite board and a second wood composite board in a mold having an upper die and a lower die, at least one of the upper die and the lower die having a protrusion, the protrusion creating a compressed region in at least one of the first and second wood composite boards; and
fusing the first wood composite board with the second wood composite board at the compressed region to form a core component without the addition of adhesive.

10. The method of claim 9, wherein the compressed region has a specific gravity between 1.00 and 1.30.

11. The method of claim 9, wherein the core component has an outer planar surface and the compressed region is defined by a channel recessed from the outer planar surface.

12. The method of claim 9, wherein the channel comprises a bottom, a first side wall, and a second side wall, the first and second side walls extending obliquely between the bottom and the planar surface.

13. The method of claim 12, wherein said first and second wood composite boards comprise a member selected from the group consisting of fiberboard, oriented strand board, softboard, and insulation board.

14. The method of claim 9, wherein said compressing comprises increasing the pressure applied to the first and second wood composite boards until a maximum pressure is reached in at least a portion of the first and second wood composite boards.

15. The method of claim 14, further comprising maintaining the maximum pressure for at least 150 seconds.

16. The method of claim 9, wherein the step of fusing comprises the step of fusing woods fibers and lignin in the compressed region to form a bond without the addition of adhesive or resin.

17. A method of making a core component comprising:

placing a first wood composite board and a second wood composite board within a mold cavity defined by an upper die and a lower die, the upper die having a first planar portion and a first protrusion and the lower die having a second planar portion aligned with the first planar portion and a second protrusion aligned with the first protrusion;

compressing the first and second wood composite boards together and fusing the wood composite boards to one another to form a core component comprising a fused region proximate the first and second protrusions without the addition of adhesive.

18. The method of claim 17, wherein said compressing forms a planar region in the core component proximate the first and second planar portions, wherein the planar region has a first density and the fused region has a second density, the second density being greater than the first density.

19. The method of claim 18, wherein the fused region comprises a channel recessed from the planar region.

20. The method of claim 19, wherein the channel comprises a bottom, a first side wall, and a second side wall, the first and second side walls extending obliquely between the bottom and the planar region.

21. The method of claim 17, wherein said fusing comprises applying heat and pressure to the first and second wood composite boards.

22. The method of claim 17, wherein the step of compressing and fusing comprises the step of fusing woods fibers and lignin in the compressed region to form a bond without the addition of adhesive or resin.

* * * * *